US009325393B2

(12) United States Patent
Striuli

(10) Patent No.: US 9,325,393 B2
(45) Date of Patent: Apr. 26, 2016

(54) MULTI-ANTENNA TRANSMISSION PROCESS AND SYSTEM AND RELATIVE MOBILE TERMINAL

(75) Inventor: Alessandro Striuli, Mestre (IT)

(73) Assignee: Sisvel Technology S.R.L., None (TO) (IT)

(*) Notice: Subject to any disclaimer, the term of this patent is extended or adjusted under 35 U.S.C. 154(b) by 263 days.

(21) Appl. No.: 13/981,865

(22) PCT Filed: Mar. 6, 2012

(86) PCT No.: PCT/IB2012/051040
§ 371 (c)(1),
(2), (4) Date: Jul. 25, 2013

(87) PCT Pub. No.: WO2012/120444
PCT Pub. Date: Sep. 13, 2012

(65) Prior Publication Data
US 2013/0315208 A1  Nov. 28, 2013

(30) Foreign Application Priority Data
Mar. 7, 2011  (IT) .............................. TO2011A0202

(51) Int. Cl.
*H04B 7/04* (2006.01)
*H01Q 1/24* (2006.01)
*H04B 7/06* (2006.01)

(52) U.S. Cl.
CPC ............. *H04B 7/0408* (2013.01); *H01Q 1/246* (2013.01); *H04B 7/063* (2013.01); *H04B 7/0617* (2013.01); *H04B 7/0452* (2013.01); *H04B 7/0456* (2013.01)

(58) Field of Classification Search
CPC .... H01Q 1/246; H04B 7/0408; H04B 7/0452; H04B 7/0617; H04B 7/063; H04B 7/0456
USPC ................................ 370/329, 331; 455/404.2
See application file for complete search history.

(56) References Cited

U.S. PATENT DOCUMENTS

| 6,130,626 A * | 10/2000 | Kane et al. .................... 340/905 |
| 7,181,244 B2 * | 2/2007 | Judson ................... H01Q 1/246 455/456.1 |
| 8,280,398 B2 * | 10/2012 | Ishii et al. ................... 455/456.1 |
| 2003/0114195 A1 * | 6/2003 | Chitrapu et al. ............... 455/562 |
| 2005/0101354 A1 * | 5/2005 | Yang ........................... 455/562.1 |
| 2006/0262747 A1 * | 11/2006 | Posamentier ................. 370/329 |
| 2009/0225879 A1 * | 9/2009 | Kloos et al. .................... 375/260 |
| 2010/0093282 A1 * | 4/2010 | Martikkala et al. .......... 455/63.4 |
| 2011/0021153 A1 * | 1/2011 | Safavi .................. H04B 7/0434 455/63.1 |
| 2012/0177142 A1 * | 7/2012 | Wagner ................ H04B 7/0452 375/296 |

FOREIGN PATENT DOCUMENTS

| JP | 2002-290315 A | 10/2002 |
| JP | 2009-296247 A | 12/2009 |
| WO | 02/41652 A2 | 5/2002 |
| WO | 03/049409 A2 | 6/2003 |

OTHER PUBLICATIONS

Gesbert et al., "From Theory to Practice: An Overview of MIMO Space—Time Coded Wireless Systems", Apr. 2003, IEEE, IEEE Journal on Selected Areas in Communications, vol. 21, No. 3, pp. all.*
International Preliminary Report on Patentability and Written Opinion dated Sep. 10, 2013, issued in PCT Application No. PCT/IB2012/051040 filed Mar. 6, 2012.
International Search Report dated Jun. 1, 2012, issued in PCT Application No. PCT/IB2012/051040 filed Mar. 6, 2012.

* cited by examiner

*Primary Examiner* — Un C Cho
*Assistant Examiner* — Shah Rahman
(74) *Attorney, Agent, or Firm* — Workman Nydegger

(57) ABSTRACT

A multi-antenna transmission process provides down-link radio coverage through a transmission system. The transmission system includes at least one multi-radiator transmitting antenna, directed towards a mobile terminal, at least one database associated with at least one coverage cell and a position of the mobile terminal, a processor cooperating with the at least one multi-radiator transmitting antenna and the at least one database to associate a transmission direction with the position of the mobile terminal by detecting a position of the mobile terminal, storing the position into the at least one database, and determining at least one transmission direction from the at least one multi-radiator transmitting antenna to the mobile terminal depending on the position stored in the at least one database, wherein at least one of the transmission parameters set in order to transmit in the transmission direction is associated with the stored position of the mobile terminal.

12 Claims, No Drawings

MULTI-ANTENNA TRANSMISSION PROCESS AND SYSTEM AND RELATIVE MOBILE TERMINAL

BACKGROUND OF THE INVENTION

1. Field of the Invention

The present invention relates to a process and a system for multi-antenna transmission, in particular employed for providing down-link cellular coverage in a mobile communications network, and to a mobile terminal thereof.

2. Present State of the Art

As known, cellular-coverage mobile telecommunication networks have been rapidly evolving since their appearance on the mass market in the eighties.

Initially these networks mainly supported voice services, but today it is increasingly urgent, and now prevalent, the demand for data services. Technologic evolution is therefore stimulated by the constant demand for performance increase in terms of network transmission speed and capacity.

Standardization is now proceeding at a pace that was unusual until last decade for the telecommunications field, but now the stimulus created by the increasing band requirements of the various new data applications is leading to the introduction of new technologies offering better performance.

The increasing need for band, however, clashes with the limited radio resource. In fact, the radio frequencies used for mobile telecommunications services are limited and are rigidly assigned to a few operators, who cannot occupy frequencies they have no license for. Accordingly, it is not generally possible to increase frequency occupation in order to cope with the continuous rise in traffic.

The technical solutions which may be adopted to increase the networks' capacity, given a certain available radio frequency band, can be classified into two main categories:

- techniques that allow greater frequency re-use, typically by increasing the number of cells (which thus become smaller and smaller, so much so that they are also known as "pico-cellular" coverages);
- techniques adopting more efficient transmission and modulation methods, which allow transmitting greater quantities of data on the available radio frequency band.

The number of cells and transmission efficiency are however both subject to physical and economical limits.

The limits of pico-cellular coverages are due to inter-cell interferences, which increase as cells get closer to one another; moreover, the increased number of radio base stations leads to considerably higher transmission costs, because of the connections that must be provided between the radio base stations and the transport network access points. In theory, the higher the number of cells in a cellular network, the greater the need for a complex transmission distribution infrastructure for connecting the radio base stations, which causes the cellular network to tend to resemble a fixed transmission network.

Network management costs also become higher because of the increased number of radio base stations.

Nevertheless, economic limits depend on considerations about economic advantage, and therefore are not absolute theoretical limits.

Technical limits, on the contrary, characterize each given technology in an absolute way.

The attainable transmission efficiency limits are determined by the fact that extreme modulations worsen the signal-to-noise ratio (SNR), until this becomes unsustainable for ensuring the proper operation of the system.

This is why intense research is being carried out to optimize transmission technologies, aiming at exploiting the available radio band at its most.

In order to offer a response to the above-described problems, MIMO techniques and techniques based on the use of "Vectorial Antennas" (also known as "Smart Antennas" or "multi-antenna system" or "multi-radiator system") have been developed over time.

In particular, MIMO techniques express a concept which was first proposed by Arogyaswami Paulraj and Thomas Kailath in 1994: these are transmission/reception techniques based on the use of multi-antenna transmitters and receivers. In a typical embodiment thereof, MIMO transmission generates "N" signals on the same carrier, which signals are however "spatially" spaced from one another. Spatial separation is obtained by radiating signals from multiple antennas located in suitably different positions, and by picking up said signals by using a receiving system composed of multiple antennas, also spatially spaced from one another, on the hypothesis that the various propagation paths between the transmitting antennas and the receiving antennas have different transfer functions due to the multiple propagation paths.

The fact that a signal originated by a transmitting antenna propagates up to a receiving antenna through a certain number of multiple propagation paths is generally known as "multipath".

This "multipath" propagation condition is normally found in cellular coverages within urban environments. Through the "multipath" effect, the signal that arrives at a point where there is a receiving antenna turns out to be the sum of a certain number of signals, one for each different path that the original signal may travel to arrive at said reception point. Said distinct signals essentially differ in the phase at which the carrier arrives at the reception point, due to the different length of each propagation path.

It is therefore clear that cases may arise wherein carriers are offset in a manner such as to be added together in a constructive way, or cases wherein carriers combine together in a destructive way. Such differences in the way that carriers combine together depend on the exact point where reception occurs, and the effects thereof may be very different (or even opposite) at distances comparable with the carrier wavelength, i.e. at distances of the order of centimeters for current radio mobile networks.

The above-described phenomenon, according to which the same signal may appear to be strong at one point and very weak at another very near point, is known as "multipath fading" or "fast fading".

Referring back to the application of MIMO techniques, it can be observed that different signals originated at different points are characterized by different "multipaths", resulting in different "multipath fadings".

A typical way to handle "multipath fading" is to equip the receiver with at least two antennas arranged at a distance equal to approx. one fourth of the carrier wavelength, so that when the signal to be received is minimum at the reception point where one antenna is located, it will not be simultaneously minimum also at the reception point occupied by the other antenna.

In the case of a MIMO transmission, the different signals transmitted on the same carrier interfere with one another, of course, but they can be distinguished in reception by the diversity of the propagation paths traveled by them.

In MIMO transmissions, the various signals transmitted from different points appear to have different strengths (different "fadings") at the various receiving elements of the receivers: in fact, in transceiving systems implementing MIMO techniques, also the receivers, not only the transmitters, must be multi-antenna systems.

A MIMO system therefore exploits "multipath fading" to distinguish among different signals transmitted on the same carrier but from distinct points.

In the case of a MIMO transmission, on the receiving side one can extract from each element of the receiving antenna system a signal given by a sum of all the transmitted signals, each transformed according to a different transfer function. In order to rebuild the original transmitted signals, it is therefore necessary to solve a system composed of as many equations as the number of receiving elements in the receiving antenna system.

It is clear that in a propagation environment not characterized by a sufficient and significant "multipath", the various transfer functions would be all very similar and virtually equal to one another, so that the system would be impossible to solve.

From a physical standpoint, it can be stated that the more the transfer functions are similar to one another, the more the various signals will disturb one another, each one being noise for the others and contributing to making them unrecognizable.

In order to make the above-mentioned system easier to solve, so as to be able to discern among the various signals transmitted on the same carrier, MIMO techniques also make use of an additional device called "precoding". "Precoding" provides for transmitting every single signal not only from a different antenna, but also with regulated phase displacement and amplitude. The objective of "precoding" is to make the system of equations to be solved in reception as simple as possible: in the most extreme and optimal case, a propagation situation is determined wherein the system to be solved in reception is characterized by a quasi-diagonal matrix, which corresponds to a case wherein each receiving antenna receives only one different signal which is significantly strong, the other signals being received very attenuated by each antenna.

In more sophisticated applications, MIMO techniques use a further device according to which every single signal is transmitted by more than one radiator and the various components (i.e. replicas of the same signal radiated by different radiators) also have different and adjustable phase and amplitude.

From a physical standpoint, as will be better explained below, the fact that every single transmitted signal is radiated by various radiators corresponds to introducing a directivity effect into the transmissions of the single signals.

It should however be noted that the "precoding" parameters must be continually updated, in that the "multipath fading" conditions change very rapidly: in fact, it is sufficient that the receiver (which, it must be reminded, is generally a radio mobile terminal) moves by just a few centimeters for the system to vary substantially.

"Precoding" must therefore be based on very sophisticated algorithms for updating the "precoding" parameters, and such algorithms must continually use feedback information communicated to the transmitter by the receiver.

Precoding efficiency is very important to determine the performance of the system: however, these algorithms may in general be very costly from a computational standpoint; for these reasons, much research activity is currently being carried out, aiming at optimizing this aspect of MIMO techniques.

In summary, a MIMO system owes its efficiency to the simple fact that multiple information streams can be transmitted on one same carrier, at the expense of the generation of much noise, which can however be handled by exploiting the "multipath fading" and said "precoding" techniques.

It is clear that "multipath fading" is indispensable for the proper operation of MIMO systems; consequently, said technology is applied to propagation situations wherein multiple paths are rather homogeneous, without a prevailing "direct" component of the signals, i.e. in complex coverage situations. In general, given the attenuation undergone by the signal because of multiple reflections, it is preferable that the transmission source emits signals at the highest possible power, so that it becomes less problematical to establish down-link MIMO transmissions, where the transmitter can be powered from the mains, than up-link transmissions, where the power resource is limited to the capacity of the battery of the mobile station, hereafter also referred to as (radio) mobile terminal or, more simply, terminal.

In short, it can be stated that MIMO techniques represent a promising solution to the problem of more efficient radio band utilization, and that the algorithms used for updating the "precoding" parameters constitute a key factor for obtaining the best performance from MIMO techniques applied to radio mobile systems.

A further known technique on which the present invention is based is the one using "Vectorial Antennas", more commonly known as "Smart Antennas" or "Array Antennas".

The so-called "Vectorial Antennas" are antennas composed of a plurality of radiating element (radiators), just like the antennas used for MIMO transmissions.

By suitably powering the different radiators, it is possible to obtain directive transmissions wherein pointing can be adjusted electronically without needing any physical movements of the antenna system.

"Vectorial Antennas" can also be used in reception and, through processes similar to those used in transmission (i.e. by dephasing the signals picked up by each element), it is possible to increase the gain of the overall system in some reception directions. However, the present invention is focused on down-link coverage, and therefore on transmitting systems.

In a transmission with a "Vectorial Antenna", every single element radiates the same signal transmitted by the other antenna elements, but with an appropriately adjusted carrier phase displacement. Because of the different point of origin of the various transmissions, these components re-combine together with a phase displacement that varies according to the propagation direction: this occurs because the originally set phase displacement is added with the phase displacement given by the geometry of the transmitting system, which varies as a function of the transmission direction. It is thus possible to adjust the whole transmission in a manner such that there are transmission directions in which interference is maximally constructive and other transmission directions in which interference is maximally destructive. The system, considered as a whole, creates an adjustable directive antenna which, within certain angles, requires no mechanical movements, but only adjustments (executable via software) of the initial phase displacements.

The effect of forming a transmission lobe in a particular direction is known as "beamforming".

It must be pointed out that the directive capacity of such antenna systems is strictly related to the number of antenna elements, since antennas made up of a larger number of elements are more directive (and therefore more directive antennas are bigger).

It is apparent from the above that there is an analogy between "precoding" and "beamforming": in both cases, in fact, there is a transmission of a signal from multiple distinct points, wherein a different phase can be applied to each component. Notwithstanding said physical analogy, the two procedures, i.e. "beamforming" and "precoding", are in practice two different procedures and are considered to be distinct techniques because they aim at different objectives.

The first procedure, "beamforming", is generally implemented with a large number of radiators in order to obtain relatively narrow transmission beams. For good directivity, as aforesaid, it is necessary to employ a number of elements of the order of ten or, more appropriately, of a few tens. Furthermore, phase displacements calculation can be performed very easily in an open loop, the geometry of the "Vectorial Antenna" being known, as a function of the propagation directions in which one wants to obtain maximum radiation.

The transmission efficiency of a "Vectorial Antenna" is not affected by the fact that an antenna made up of multiple elements is used in reception.

The second procedure, "precoding", can also be implemented with just a few radiators, even with only two antennas (this being the most widespread case).

In the "precoding" procedure, phase displacements calculation is generally performed in a closed loop in order to optimize the separation of two or more signals at a multi-antenna receiving device, which must therefore provide the transmitter with a continuous (or very frequent) feedback.

It is clear that "precoding" techniques require a number of computations that rapidly increases with the order of an antenna (i.e. with the number of elements that constitute the antenna).

MIMO techniques have already been employed in some radio mobile systems, and they will be used to a larger extent in the systems currently being standardized: however, due to the complexity of the art, it can be foreseen that their use will be limited to applications with a reduced order of antennas: this means that two or four transmitting elements and the same number of receiving elements will be mostly used.

It should be noted that a reduced order corresponds to reduced frequency re-use, thus posing a limit to the efficiency of the system as a whole.

The "Vectorial Antennas" technology, although already mature in many applications, has not yet been used in cellular coverage systems. The main cause of this is that the position of the mobile station within the cell could not be determined with the necessary accuracy, nor were any technologic standards available which allowed using sufficiently accurate information about terminal location; furthermore, the radio paths involved in transmissions on cellular coverage networks are normally reflected paths, and therefore it is almost always not true that it is convenient to transmit in the direction of the transmitter-receiver connecting line when transmitting towards a terminal.

These and other problems of variable nature have prevented the discovery of a feasible method for determining the pointing direction of the antennas in radio mobile networks, de facto preventing the use of "Vectorial Antennas" for cellular coverage applications.

The industry is currently deeply involved in the attempt at combining MIMO techniques with "beamforming", which is typical of "Vectorial Antennas", but all the solutions adopted so far have not proven to be sufficiently efficient and easy to implement.

In fact, as aforementioned, if the parameters required for determining the "beamforming" (i.e. the phase displacements to be applied to the components of one signal transmitted from multiple radiating elements in order to transmit it in a directive manner) are computed in a closed loop by using continuous feedback from the terminal, the computation complexity is such that it is necessary to limit the order of the antenna (i.e. the number of radiating elements). thereby also limiting the potential frequency re-use and transmission directivity.

Conversely, should one follow the route of determining the "beamforming" by computing the necessary phase displacement parameters in an open loop, this would lead to the problem of having to correctly choose the optimal pointing direction in a complex propagation environment characterized by many reflections.

This latter problem can be faced through some sort of implicit feedback from the terminal, the term "implicit feedback" referring herein to the fact that the terminal does not explicitly transmit a signal indicating how it is receiving, but such information is nonetheless obtained. It is in fact possible that at the transmission point there is also a directive receiver capable of "listening" to the signals coming from the mobile terminal, which therefore, in addition to acting as a receiver, must also transmit towards that radio base station, and of determining the optimal propagation direction by choosing the one in which reception strength is highest.

This mode has been recently set up at experimental level and is described, for example, in "A Proposal of DPC Beamforming for Open Loop Multiuser MIMO Transmissions"— Tomoko Matsumoto, Noriaki Miyazaki and Satoshi Konishi—KDDI R&D Laboratories, Inc.—IEEE ICC 2010 proceedings.

Although the set of processing operations necessary for implementing the technique proposed therein is still rather complex, it may yield substantial advantages: in fact, it is possible to implement higher-order antennas and to reach very interesting levels of spectrum utilization efficiency.

However, such a technique has a structural limit: in fact, it requires that the propagation channels be symmetrical, in that the transmission direction is determined depending on the quality of reception in the same direction.

This assumption is not generally true: it is in fact possible (and advantageous) that the coverages of the next-generation networks are characterized by the use of distinct radio stations positioned in different points to support up-link radio transmission (UL=from terminal to radio base station) and down-link transmission (DL=from radio base station to terminal).

SUMMARY OF THE INVENTION

It is therefore one object of the present invention to overcome the above-mentioned problems of the prior art by providing a process and a system for multi-antenna transmission, in particular used for providing down-link cellular coverage in a mobile communications network, which allow to simultaneously apply MIMO techniques and the directive transmission typical of a "Vectorial Antenna", which may also be composed of many elements (thus being highly directive).

It is another object of the present invention to provide a process and a system for multi-antenna transmission, in particular used for providing down-link cellular coverage in a mobile communications network, wherein the computation and optimization of the parameters of the "precoding matrix" (i.e. the set of parameters that must be constantly updated to ensure efficient signal transmission) are considerably simpler than in the methods known in the art, even in the case of high MIMO orders.

It is a further object of the present invention to provide a process and a system for multi-antenna transmission, in particular used for providing down-link cellular coverage in a mobile communications network, which allow for a significant reduction of the signal-to-noise ratio (SNR).

It is yet another object of the present invention to provide a process and a system for multi-antenna transmission, in particular used for providing down-link cellular coverage in a mobile communications network, which allow to overcome the constraint of symmetrical coverage, thereby further simplifying the processing required for determining the "beamforming".

These and other objects and advantages of the invention, which will become apparent from the following description, are achieved through a multi-antenna transmission process as set out in claim 1.

In addition, these and other objects and advantages of the invention are achieved through a multi-antenna transmission system as set out in claim 9.

Also, these and other objects and advantages of the invention are achieved through a mobile terminal as set out in claim 10.

Preferred embodiments and non-obvious variants of the present invention are specified in dependent claims.

It will become immediately apparent that what is described herein may be subject to innumerable variations and modifications (e.g. in shape, dimensions, arrangements and parts having equivalent functionality) without departing from the protection scope of the invention as set out in the appended claims.

DETAILED DESCRIPTION OF THE PREFERRED EMBODIMENTS

The present invention will be described more in detail with reference to a few preferred embodiments thereof, which are only provided by way of non-limiting example.

In general, the process and system for multi-antenna transmission according to the present invention relate to mobile communications, in particular to a transmission system to be used for providing the so-called "down-link" coverage (from a network station to a user's mobile station), i.e. the radio coverage necessary for establishing communications from a network to mobile terminals. In particular, as will be explained in more detail below, the process and system for multi-antenna transmission according to the present invention make particular use of the "Vectorial Antenna" technology (which, as aforesaid, is a special technique for creating directive antennas) integrated with MIMO technology (Multiple Input Multiple Output).

The process and system according to the present invention are based on the availability, which will be ensured in future networks, of information about the position of the apparatuses involved in radio mobile networks, in particular of the receiving devices represented by mobile terminals. For example, the LTE/LCS (Long Term Evolution/LoCalization Services) standard requires that the position of the terminal be constantly communicated to the network over the system's control channels. This position may, for example, be communicated to the network by the mobile terminal through detection means of the latter (GNSS locator, three- or multi-lateration systems, etc.) or it may be detected by the network through any method, usually in cooperation with the mobile terminal (e.g. three- or multi-lateration with different radio base stations).

In the future, for example, the mobile terminal may be obliged to communicate its own position at certain time intervals (for possible database updates), or at cell change, or in general whenever this should be considered useful by the radio mobile network. In addition or as an alternative, the position transmission may take place upon explicit request from the radio base station, e.g. on a radio signalling channel, whether upon a special request message or when signalling messages or data packets are sent to the transmission system, e.g. the first time it comes in contact with it.

The LTE case is mentioned herein as an emblematic example, in that the LTE standard will probably become the most widespread standard of future radio mobile networks; it can however be foreseen that location information, due to its great importance in relation to the development of a large number of services, will be present in all future mobile communications systems, and as this technology evolves such information will become more and more available (most likely, at the beginning only in environments with GPS or Galileo coverage or in other satellite positioning systems, but availability will progressively increase in indoor environments as well), and will become increasingly accurate over time.

If the position of the radio mobile terminals is known, a radio base station equipped with a "vectorial" antenna can direct the transmission beam in the most appropriate direction to allow the radio mobile terminal in that position to receive at best the transmission directed thereto.

In an open environment between a station and a mobile terminal, said direction is the one determined by the station-terminal connecting line, whereas in complex propagation environments, the system according to the present invention requires that the optimal propagation direction is known a priori for each "location" of the mobile terminal.

The system according to the present invention therefore advantageously comprises at least one database associated with at least one coverage cell of the mobile communications network, containing the propagation directions to be associated with each "location" or position that may be occupied by the receivers of the radio mobile terminals which may get into that cell position. This invention is nevertheless also applicable to only one or more areas of one or more radio mobile cells, wherein by implementing the present invention it may be possible to solve technical problems which otherwise cannot be conveniently overcome through known techniques or in a more advantageous manner than by using known techniques.

Of course, the positions where a mobile terminal may be located can be defined with the accuracy ensured by localization, which, by way of example, may be of the order of a few meters. It must however be observed that not all positions must necessarily be defined with the same accuracy; in fact, there may be quite large "locations" reached by one same beam. For example, a mobile terminal placed inside a room, even a rather large room, having only one window, will be reached properly by a transmission beam directed towards the window of said hypothetical room, independently of the exact point where the terminal is located inside the room.

Furthermore, as will be discussed later in more detail, the multi-antenna transmission process for down-link radio coverage (from radio base station to terminal) according to the present invention in a mobile communications network through a transmission system like the one described above comprises the steps of:

a) detecting the position of the mobile terminal;
   b) storing said position into the database;
   c) determining at least one transmission direction of at least one transmission beam from at least one of said multi-radiator transmitting antennas depending on the position stored in the database, preferably through a transmission technique of the MIMO type.

Said database is built at network installation time, or by activating suitable learning algorithms while the system is already in operation. In this latter case, the database is initially empty or partially empty (i.e. there are portions thereof with which no propagation directions and respective transmission parameters are associated), and therefore the optimal direction must be determined by using more costly procedures, which however only need to be activated once for each "location" or areas having the same optimal pointing direction. A lower efficiency at this stage becomes thus tolerable, although the allocation of the radio resources required for establishing the connection is significantly slow.

The use of the above-mentioned learning algorithms may be based on many techniques, and they can be optimized and made faster and more efficient. At any rate, the technical feasibility of such algorithms can certainly be ensured by using very simple modalities, e.g. by using a directive transmission that scans a wide angle: in this case, the mobile terminal may begin communicating the reception quality associated with each direction, and the algorithm will just have to choose the best direction and associate it with the terminal position in the database.

It must be observed that the principle used above for describing one possible learning algorithm has been mentioned herein in order to reason about feasibility, but certainly many other improvements may be made to reduce its complexity and execution time. In any case, the complexity of said algorithm briefly described above is similar to that which is accepted in the previously mentioned technique by "Tomoko Matsumoto et al.", which however has the drawback that it must be actuated at each connection, not only at an initial stage for populating a database.

Algorithms like those mentioned above, are useful not only for initially populating the to database, they can also be regularly used for updating the data of said database. In fact, the best transmission direction may change over time depending on variations in the propagation environment, e.g. a new building.

Also the criteria used for updating the database may be subject to improvement and optimization. The calculation (or re-calculation) of the best propagation direction associated with a certain position may take place in various circumstances, e.g. when the datum is not present (at the beginning, or when the operator decides to delete the data because the coverage area has undergone significant changes in the propagation characteristics), or when the terminal requests it because the signal has not been received with adequate quality, or from time to time, when the network is unloaded and frequencies can be used for the purpose of updating or refining the level of detail and/or accuracy of the database, or according to other criteria that can be defined at will by the user.

By using the terminal localization information is thus possible to combine the MIMO technique with the "Smart Antennas" technique that allows making directive transmissions: the system according to the present invention comprises therefore suitable processing means cooperating with the transmitting antennas and the database to determine the transmission direction of at least one transmission beam depending on the position, preferably through a transmission technique of the MIMO type, said processing means being thus adapted to associate said transmission direction with the position of the mobile terminal in a manner such that the transmission direction is suitable, or even optimal, for reaching the mobile terminal receiver.

The invention will now be described more in detail with reference to a particular case wherein the radiating antenna is composed of "M" radiating elements and "N" is the desired re-use factor.

In general, if the multi-antenna transmission system is composed of "M" radiating elements (antennas) and one wants to transmit a number "N" of signals on one same carrier, each one of the "N" signals being transmitted "M" times because there are "M" available antennas, the overall transmission will require "N"×"M" (complex) parameters, each one associable with the phase (and the amplitude) at which every single component of every single signal will be transmitted by every single radiating element. Keeping constantly updated this parameter matrix of "N"×"M" size (corresponding to phases of signals being transmitted) becomes particularly exacting as "N" and "M" increase, and the research for optimal combinations, which are those that make it easier to find a solution to the problem to be solved in reception, may be a rather complex issue when it must be done in real time.

As aforementioned, the techniques known in the art are normally applicable in the presence of low orders, i.e. when "N" and "M" are small. Hence, the technical feasibility of such solutions poses a limit to the size of said matrix "N"× "M".

In the present invention, just as in the prior-art document by "Tomoko Matsumoto et al.", which is not however applicable in general and shows a certain level of complexity, the main focus is on the physical meaning of the "N"×"M" parameters of the above-described matrix (hereafter referred to as "precoding" matrix), aiming at simplifying the computation of said "precoding" matrix.

In fact, the invention utilizes in this manner the "Vectorial Antennas" technology, which, in the most interesting implementation, is integrated with the MIMO technology. According to the teaching of the present invention, the computation and optimization of the parameters of the "precoding" matrix is facilitated by the use of particular localization information. This simplification consists in using a database which associates with each position occupied by a mobile terminal the information necessary for configuring a "Vectorial Antenna", so that it can transmit in the most appropriate direction in order to reach the mobile terminal concerned.

In this manner, when the radio base station is notified that a certain mobile terminal is in a position already stored in the database or in a position considered to be sufficiently close thereto, the processing means will use the pointing direction associated therewith to point the transmissions towards that mobile terminal without having to make any closed-loop parameter computation, thus enormously reducing the time necessary for establishing the transmission, if said parameters are known for a given pointing direction. As an alternative or in addition to the information about the most suitable transmission direction, one or more parameters necessary for configuring the optimal pointing of the multi-antenna system may have been directly stored in the database, thus reducing even further the time that elapses between the reception of the signaling from the terminal and the transmission of the consequent response signal, since this eliminates the need for making such computations or considerably reduces the complexity thereof.

It should be observed that the "M" parameters that determine the transmission phases of the components of every single signal on the "M" antenna elements can be expressed as "M−1" values of relative phase displacement among the various components, and therefore said first "M−1" parameters determine (for the reasons previously explained) which is the direction of maximum radiation, while a further M-th parameter determines the phase of the carrier of the signal in the direction of maximum radiation.

According to such modelling, it can be stated in conclusion that the mean value of an electric field associated with a given signal in a relatively large area (determined by the beam's radiation amplitude) is a function of "M−1" parameters, whereas the phase of the carrier in the direction of maximum radiation is a function of a single parameter, and consequently only one parameter affects the "fast fading", i.e. the field dishomogeneities within short distances comparable with the carriers' wavelength.

Whilst it is not necessary to continually update the parameters that determine the direction of maximum radiation, it is however necessary to continually optimize the parameter that determines the phase of the carrier in the direction of maximum radiation. As a consequence, only this latter parameter needs to be updated with known methods for determining "precoding" parameters through closed-loop computations, whereas the known MIMO techniques based on the utilization of multi-antenna systems in reception are used for discriminating between the useful signal and the interfering signals present in the reception area.

This modelling clarifies why the best selection of the first "M−1" parameters is quite stable in the course of a call, in that it does not vary with small movements of the mobile terminal, while only the optimization of the last parameter requires faster and more constant updates.

In addition: the first "M−1" parameters, being a function of the position of the mobile terminal with an approximation of the order of meters, can theoretically be computed in an open loop by starting from the terminal position (with said approximation), while only the last parameter must be updated with frequent feedback from the terminal as in classic transmissions using MIMO techniques.

A this point it is clear that, from a conceptual viewpoint, it is necessary to associate with each transmission system a database that, in turn, associates the receiver position with the transmission direction to be set, and that, the transmission direction being known, it is relatively easy to compute the parameters to be set in the "Vectorial Antenna" in order to transmit in that direction. From a practical viewpoint, it is therefore clear that also such computations, though simple, can be avoided by storing directly into the database the transmission parameters to be set in the "Vectorial Antenna" in order to transmit in the desired direction.

With this measure, most of the parameters of the "precoding" matrix ("M"-1×"N") can be easily computed in an open loop or, if they have been pre-computed and are already available in said database, they do not even have to be computed anymore.

It should be pointed out that searching said database, which obviously is very large, is a very simple operation because the primary search key used for retrieving the data consists of the position of the mobile terminal, and therefore, due to its nature, it is an ordered and orderable key.

It is apparent that MIMO techniques are generally applicable in complex propagation environments (so much so that they cannot operate in the absence of "multipath" propagation); it is also apparent that, however, such techniques are resorted to in environments characterized by much traffic: it is therefore realistic to propose the application of learning algorithms wherein the optimal propagation direction is initially determined with more complex estimates (requiring longer computation times), and then each transmitting site composes a map of its own where each approximated position corresponds to a predetermined optimal propagation direction (previously learned).

The transmission system and process according to the present invention are thus preferably implemented in a DL cellular coverage infrastructure for radio mobile networks, wherein a "Vectorial Antenna" is used for determining a suitable "beamforming", along with the MIMO technique with "precoding" (in particular, the MU-MIMO technique), and wherein the algorithms for determining the optimal "precoding matrix" are considerably simplified, the "M−1"×"N" parameters being determined in an open loop by exploiting the localization information that can be made available by applying various localization techniques (also evolutionary ones), and only "N" parameters being continually updated by making continual computations included in a feedback process which is typical of MIMO techniques.

It is clear that the practical implementation of the teachings of the present invention is bound to the capability of determining the position of the terminal within the down-link cell.

As a result, all techniques for localizing a mobile terminal represent additional prior art which is useful for the invention: it is apparent that there are high expectations for future progressive improvements of such localization techniques, from which the performance of the invention may also benefit.

One immediate way, as already mentioned, is to assign to the mobile terminal itself, appropriately equipped with detecting means, the task of determining its own position and communicating it to the network, in particular to the database, through suitable means of communication and through suitable procedures, some of which have already been outlined at standardization level. The mobile terminal may determine its own position on the basis of, for example, localization through the Galileo system (when the latter is operational) or through another satellite navigation system such as, for example, the GPS system), with which some further algorithms may be associated for when the terminal is not in view of the satellites (i.e. located in "deep indoor" environments), or through specially developed algorithms based on triangulations with the terrestrial network.

In addition, it is conceivable that the process according to the present invention also activates hand-over procedures in order to move a mobile terminal from one radio channel to another during a transmission. In fact, considering that the present invention allows making known all the positions of all the terminals served by a cell and the respective transmission directions to be used for each mobile terminal, it then becomes possible to organize the transmissions in a manner such that the same carrier is used in communications with terminals located in unreachable positions, by transmitting in directions as broad as possible. For example, if a cell transmits on two carriers and must serve ten mobile terminals, the network will provide for organizing the transmissions in such a way that the transmission directions are alternated in the two carriers: it is clear that, in order to maintain this kind of optimization, one must follow the movements of the terminals as well as the activations and deactivations of connections, so that hand-overs become necessary not only when said mobile terminal is moving, but also when the context of the other active connections changes.

Other modalities by which a mobile terminal can be located with sufficient accuracy in view of an advantageous application of the teachings of the present invention will certainly be developed when searching for a solution to the localization problem (which is a separate problem), e.g. through consolidation of "fingerprinting" techniques (based on the creation of environmental maps that detail, point by point, the presences of electromagnetic fields having particular spectral characteristics) or through the adoption of "ad hoc" infrastructures, or through methods of collaborative localization.

Another alternative solution is to have the network estimate the position of the mobile terminal. This solution is certainly interesting, but it requires the availability of sufficient information for this very purpose, and in particular it requires further evolutions. The main advantage induced by the present invention is that it allows to obtain optimal separation, in the reception system, between the useful signal and the noise signals (in that the latter are much more attenuated) very quickly and with a considerable simplification of the computations to be made for the transmission: this benefit allows to increase the number of transmissions on carriers at the same frequency, the tolerable SNR being equal, and to facilitate the creation of complex plants (transmitting antennas with many elements and management of many signals on the same carriers); the final and tangible result is that the overall capacity of the system increases in the presence of the same available band.

A further advantage is that, while MIMO techniques work well in the presence of complex "multipaths", by applying the teachings of the present invention it is possible to overcome this limitation because, if the mobile receiver is in view of the transmitter, the simple application of sufficiently directive "beamforming" is enough for the receiver to distinguish and isolate the useful signal directed thereto.

Of course, the present invention also relates to a receiving apparatus, in particular belonging to the above-described multi-antenna transmission system for down-link radio coverage, which is adapted to implement the process according to the present invention. In particular, the mobile terminal according to the present invention may comprise processing means adapted to cooperate with the database in order to transmit feedback information about its own operation to the system, e.g. reception quality, and the system and process can verify that said signalled reception quality is as expected for the position occupied by it and stored in the database: alternatively, it is possible to command an update of the parameters stored in the database. The mobile terminal may also send to the transmission system information about its own current position detected through any available means.

The invention therefore allows implementing to advantage an asymmetrical coverage scheme, which is Macro-Cellular in down-link and Pico-Cellular in up-link. In its preferred application, in fact, the invention shows the most interesting benefits in DL coverage, and this may be useful to avoid extreme reductions in size of the DL cells. As far as UL coverage is concerned, one may advantageously decide to increase the capacity by increasing the number of receiving stations.

The invention provides for using the "Vectorial Antennas" technology extensively, thereby overcoming and controlling the reasons that so far have precluded its use; such technology brings general benefits to any cellular coverage system, in that it drastically reduces inter-cell interference caused by frequency re-use. This fact has a positive impact on cellular planning, with positive effects also on the capacity of the network as a whole.

It is apparent that the most important advantages of the present invention are attained with the version that adopts MU-MIMO techniques, wherein the various signals transmitted at the same frequency are intended for different users that are generally located in different points.

It must be pointed out that the application of the teachings of the present invention, in addition to adding together the advantages obtained from the application of MIMO techniques and those obtained from using "Vectorial Antennas", also significantly improves, by combining these two technologies, the performance of MIMO reception, in that the received signal is characterized by a much better SNR than that corresponding to the same MIMO transmission made with non-directive antennas.

The extent of this SNR improvement depends on how the different signals intended for different users are distributed in the various directions: it is clear that the best advantages are attained when transmitting signals on the same carrier in directions as broad as possible. This latter effect can be optimized by defining new cellular coverage typologies and new channel allocation algorithms. For example, in order to optimize channel allocation, hand-over procedures may be executed for handling the movements of the mobile stations, or when connections are set up or released by other nearby users.

It should also be noted how the set of signals to be transmitted on the same carrier according to the MIMO technique can be spatially separated (i.e. transmitted from different virtual physical points, therefore with different "multipath fading" of the carrier at the reception points) or (most importantly) radiated in different directions.

The MIMO receiver can thus make use of a further facilitation useful for discerning among the various signals; in fact, the signal directed towards the receiver will generally appear stronger than the others, which are transmitted at the same frequency but in different directions.

The use of "Vectorial Antennas" as "MIMO multi-antennas" also gives way to a series of opportunities of technologic optimizations and innovations for an efficient physical implementation of such multi-antenna systems. In fact, the multiplicity of elements may be exploited to obtain the spatial separation useful for MIMO techniques and to control the "beamforming". It must be highlighted, in fact, that a "Vectorial Antenna", being already a multi-antenna system, may in principle be managed like a MIMO transmitter.

It should also be noted that the MIMO receiver may be, in theory, used in this MIMO transmission mode combined with the "Vectorial Antennas" technology without requiring any hardware modifications; in fact, as aforesaid, the efficiency of a "Vectorial Antenna" imposes no requirements as to the receiver's characteristics.

The preferred embodiments of the invention described herein may, of course, be subject to further modifications and variations without departing from the inventive idea. In particular, it will be immediately apparent to those skilled in the art that the present invention may be subject to many variations and modifications functionally equivalent to those described herein, which fall within the protection scope of the invention as set out in the appended claims.

The invention claimed is:

1. A multi-antenna transmission process for providing down-link radio coverage from a radio base station to a mobile terminal in a network for radio mobile communications through a transmission system comprising:

at least one multi-radiator transmitting antenna comprising a plurality of M radiating elements each transmitting a plurality of N signals on one same carrier, each one of the N signals being transmitted M times, the overall transmission requiring N×M parameters forming a precoding matrix, each multi-radiator transmitting antenna being directed towards at least one mobile terminal;

at least one database associated with at least one coverage cell of said mobile communications network and containing information about a position of said mobile terminal;

a processor cooperating with said at least one multi-radiator transmitting antenna and said at least one database, said processor being adapted to associate a transmission direction with said position of said mobile terminal, wherein said transmission direction is suitable for reaching said mobile terminal and said transmission direction depends on a portion of said parameters that determines a phase of the carrier in a direction of maximum radiation, comprising the steps of:
a) detecting a position of said mobile terminal;
b) storing said position into said at least one database;
c) determining at least one transmission direction of at least one transmission beam from said at least one multi-radiator transmitting antenna to said mobile terminal wherein said at least one transmission direction is determined based on at least a portion of the transmission parameters of the precoding matrix required for transmitting in said transmission direction that has been stored by said processor in said database in association with a stored position of said mobile terminal, and wherein some of the remaining parameters of the precoding matrix are stored by the processor in said database as values of relative phase displacement with respect to said portion of parameters determining the phase of the carrier in the direction of maximum radiation.

2. The transmission process according to claim 1, wherein said portion of the transmission parameters determining the phase of the carrier in the direction of maximum radiation is calculated in a closed loop process, while some of the remaining parameters of the precoding matrix are calculated in an open loop process.

3. The transmission process according to claim 1, wherein said step a) comprises the sub-step of determining said position of said mobile terminal through processing performed by network elements.

4. The transmission process according to claim 1, wherein steps b) and/or c) are performed by using learning algorithms.

5. The transmission process according to claim 1, further comprising the possibility of activating hand-over procedures to move the transmissions towards said mobile terminal from one radio channel to another in such a way that said transmission directions are alternated in different carriers.

6. The transmission process according to claim 1, further comprising the possibility of comparing reception quality information signaled by said mobile terminal with the reception quality expected for said position occupied by said mobile terminal and stored in said database.

7. The transmission process according to claim 6, further comprising the step of updating said database if said reception quality information signaled by said mobile terminal does not correspond to that stored in said database.

8. The transmission process according to claim 1, wherein said step a) comprises the step of receiving information about the current position of one of said mobile terminals from said mobile terminal.

9. A multi-antenna transmission system for down-link radio coverage from radio base station to mobile terminal in a radio mobile communications network through a transmission system implementing the process according to claim 1.

10. The multi-antenna transmission system according to claim 9, wherein the mobile terminal further comprises a second processor adapted to cooperate with the processor of said multi antenna transmission system for transmitting to the processor feedback information about a current position of said mobile terminal.

11. The multi-antenna transmission system according to claim 10, wherein said feedback information is sent when at least one of the following events occurs:
a) reception of a command from said transmission system;
b) transmission of a connection request on a radio service channel towards said transmission system;
c) expiry of a preset time interval;
d) detection of a radio mobile cell change.

12. A mobile terminal adapted to receive transmissions from a multi-antenna transmission system for downlink radio coverage from radio base station to mobile terminal, said transmissions being processed according to claim 1.

* * * * *